(12) United States Patent
Taylor

(10) Patent No.: US 7,905,345 B2
(45) Date of Patent: Mar. 15, 2011

(54) CONVEYOR SYSTEM AND METHOD FOR ACCUMULATING PACKAGES OF VARYING LENGTHS

(75) Inventor: Bryan Dale Taylor, Bono, AR (US)

(73) Assignee: Hytrol Conveyor Company, Inc., Jonesboro, AR (US)

( * ) Notice: Subject to any disclaimer, the term of this patent is extended or adjusted under 35 U.S.C. 154(b) by 0 days.

(21) Appl. No.: 12/541,694

(22) Filed: Aug. 14, 2009

(65) Prior Publication Data
US 2009/0301839 A1    Dec. 10, 2009

Related U.S. Application Data

(63) Continuation of application No. 11/146,869, filed on Jun. 7, 2005, now Pat. No. 7,591,366.

(51) Int. Cl.
*B65G 13/06* (2006.01)
(52) U.S. Cl. .............................. 198/781.05; 198/781.09
(58) Field of Classification Search .............. 198/464.1, 198/461.1, 502.1, 502.2, 502.3, 349.9, 781.5–781.11
See application file for complete search history.

(56) References Cited

U.S. PATENT DOCUMENTS

| | | | |
|---|---|---|---|
| 3,219,166 A | 11/1965 | Collins et al. | |
| 3,279,583 A | 10/1966 | Abegglen | |
| 4,044,897 A | 8/1977 | Maxted | |
| 4,088,224 A | 5/1978 | Kittredge | |
| 4,453,627 A | 6/1984 | Wilkins | |
| 4,488,638 A | 12/1984 | Morgan et al. | |
| 4,562,920 A | 1/1986 | Jaffre | |
| 4,798,282 A | 1/1989 | Sperduti et al. | |
| 4,915,209 A | 4/1990 | Canziani | |
| 4,974,719 A | 12/1990 | Chenevard | |
| 5,052,541 A | 10/1991 | James et al. | |
| 5,060,785 A | 10/1991 | Garrity | |
| 5,086,910 A | 2/1992 | Terpstra | |
| 5,117,961 A | 6/1992 | Nicholson | |
| 5,285,887 A | 2/1994 | Hall | |
| 5,318,167 A | 6/1994 | Bronson et al. | |
| 5,335,777 A | 8/1994 | Murphy et al. | |
| 5,358,097 A | 10/1994 | Bakkila et al. | |
| 5,456,347 A | 10/1995 | Best et al. | |
| 5,501,315 A | 3/1996 | Loomer | |
| 5,551,543 A | 9/1996 | Mattingly et al. | |
| 5,653,325 A | 8/1997 | Enomoto | |

(Continued)

OTHER PUBLICATIONS

Final Office Action; U.S. Appl. No. 11/146,869; Final Office Action Mail Date Apr. 20, 2009; 12 pages.

*Primary Examiner* — Mark A Deuble
(74) *Attorney, Agent, or Firm* — Alston & Bird LLP

(57) ABSTRACT

A drive controller for controlling movement of a plurality of packages by an accumulation conveyor. The drive controller is configured to determine a length of each of the packages and to coordinate driving of a number of zones needed to accommodate the package. For example, a sensor in each of the conveyor zones communicates blockage by the packages to the drive controller. The drive controller determines a sequence of blockage of the sensors in adjacent zones. Blockage of the sensor in an upstream zone before the sensor in a downstream zone indicates an oversized package that extends longer than a zone length of the downstream zone and into the upstream zone. The drive controller is configured to drive the downstream zone and upstream zone simultaneously when detecting the oversized package.

12 Claims, 15 Drawing Sheets

U.S. PATENT DOCUMENTS

| | | |
|---|---|---|
| 5,730,274 A | 3/1998 | Loomer |
| 5,860,504 A | 1/1999 | Lazzarotti |
| 5,862,907 A | 1/1999 | Taylor |
| 5,904,239 A | 5/1999 | Narisawa |
| 5,991,041 A | 11/1999 | Woodworth |
| 6,035,999 A | 3/2000 | Hall |
| 6,193,054 B1 | 2/2001 | Henson et al. |
| 6,286,656 B1 | 9/2001 | Huang et al. |
| 6,315,104 B1 | 11/2001 | Ebert |
| 6,460,683 B1 | 10/2002 | Pfeiffer |
| 6,484,066 B1 | 11/2002 | Riess et al. |
| 6,522,943 B2 | 2/2003 | Dierauer |
| 6,662,937 B2 | 12/2003 | Warnecke |
| 6,776,277 B2 | 8/2004 | Wiehler |
| 6,843,362 B2 | 1/2005 | Tachibana et al. |
| 6,860,381 B2 | 3/2005 | Newsom et al. |
| 7,263,409 B2 | 8/2007 | LeVasseur et al. |
| 7,280,889 B2 | 10/2007 | Knepple et al. |
| 2001/0010285 A1* | 8/2001 | Itoh et al. ............ 198/781.06 |

* cited by examiner

| COMBINATION NUMBER | MODULE SENSOR STATE | DOWNSTREAM SENSOR STATE | ZONE STOP INPUT STATE | DOWNSTREAM ZONE OUTPUT STATE | MODULE ZONE OUTPUT STATE |
| --- | --- | --- | --- | --- | --- |
| 1 | CLEAR | CLEAR | OFF | N/A | RUN |
| 2 | BLOCKED | CLEAR | OFF | N/A | RUN |
| 3 | CLEAR | BLOCKED | OFF | N/A | RUN |
| 4 | BLOCKED | BLOCKED | OFF | N/A | STOP |
| 5 | CLEAR | CLEAR | ON | N/A | RUN |
| 6 | BLOCKED | CLEAR | ON | N/A | STOP |
| 7 | CLEAR | BLOCKED | ON | N/A | RUN |
| 8 | BLOCKED | BLOCKED | ON | N/A | STOP |

FIG. 5

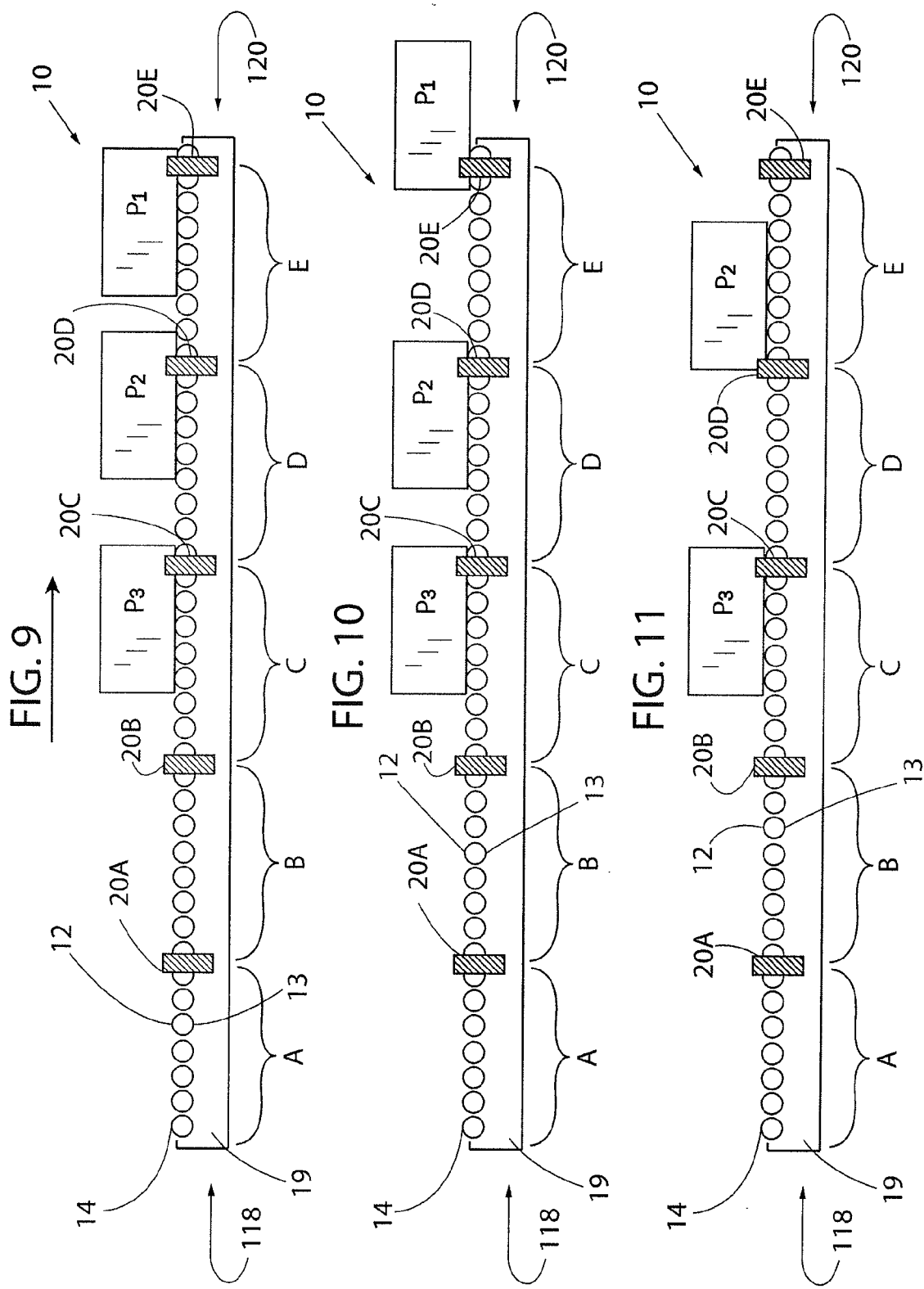

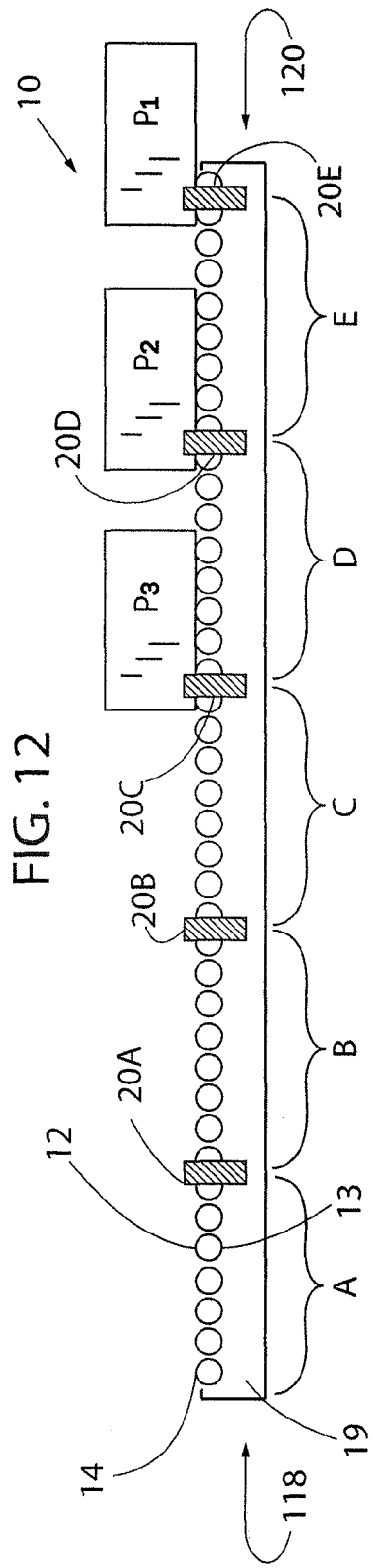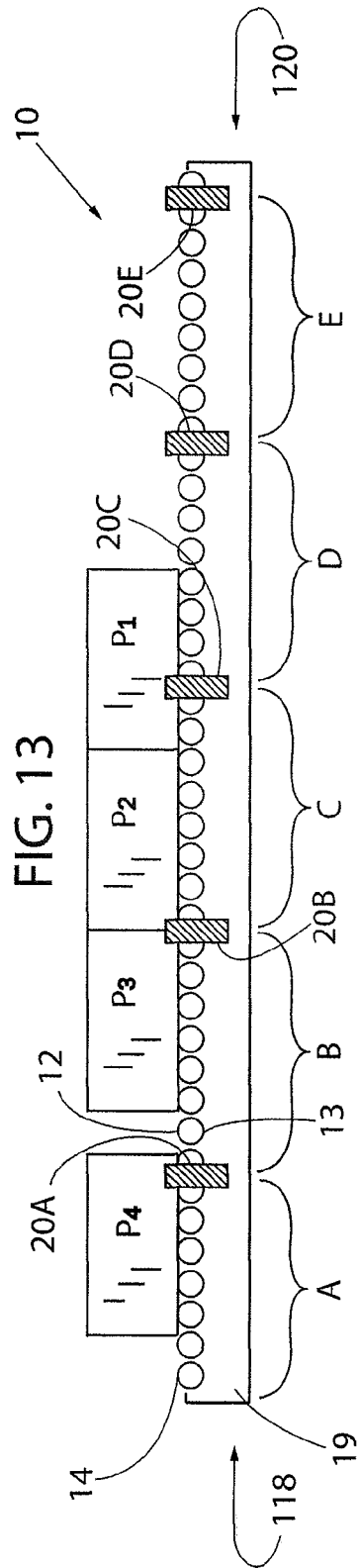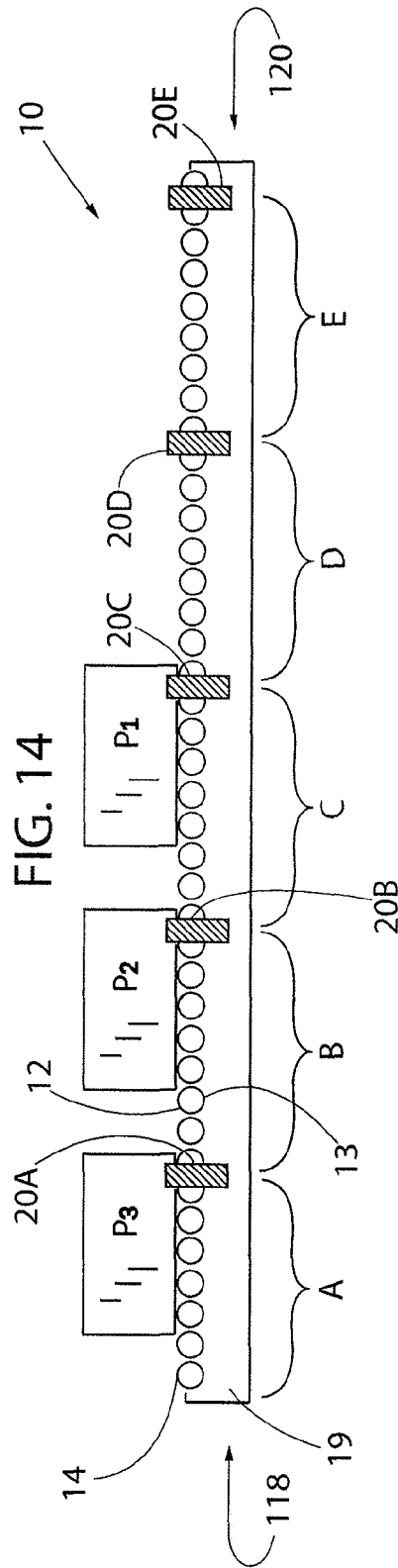

| COMBINATION NUMBER | MODULE SENSOR STATE | DOWNSTREAM SENSOR STATE | ZONE STOP INPUT STATE | DOWNSTREAM ZONE OUTPUT STATE | MODULE OR DOWNSTREAM SENSOR BLOCKED FIRST | MODULE ZONE OUTPUT STATE |
|---|---|---|---|---|---|---|
| 1 | CLEAR | CLEAR | OFF | N/A | N/A | RUN |
| 2 | BLOCKED | CLEAR | OFF | N/A | N/A | RUN |
| 3 | CLEAR | BLOCKED | OFF | STOP | N/A | RUN |
| 4A | BLOCKED | BLOCKED | OFF | STOP | N/A | STOP |
| 4B | BLOCKED | BLOCKED | OFF | RUN | MODULE | RUN |
| 4C | BLOCKED | BLOCKED | OFF | RUN | DOWNSTREAM | STOP |
| 5 | CLEAR | CLEAR | ON | N/A | N/A | RUN |
| 6 | BLOCKED | CLEAR | ON | N/A | N/A | STOP |
| 7 | CLEAR | BLOCKED | ON | N/A | N/A | RUN |
| 8 | BLOCKED | BLOCKED | ON | N/A | N/A | STOP |

CONVEYOR SYSTEM AND METHOD FOR ACCUMULATING PACKAGES OF VARYING LENGTHS

CROSS-REFERENCE TO RELATED APPLICATIONS

This application is a continuation and claims priority to U.S. patent application Ser. No. 11/146,869, filed Jun. 7, 2005, now U.S. Pat. No. 7,591,366 which is hereby incorporated by reference in its entirety.

BACKGROUND OF THE INVENTION

1. Field of the Invention

The present invention is directed to conveyor systems, and more particularly to controllers for accumulation conveyors.

2. Description of Related Art

Conveyors are used to transport goods and packages in all types of environments and experience especially heavy use in manufacturing and shipping industries. In addition, characteristics of the flow of goods and packages along such conveyor systems, such as timing and positioning of the goods and packages, must often be tailored to the needs of the manufacturer or shipper. Accumulator conveyor systems are divided into zones in which a driving force may be selectively applied to a conveying surface which provides each package with a stopping position. As a result, packages or goods may be accumulated in successive zones for eventual discharge from the conveyor.

As an example, U.S. Pat. No. 5,862,907 to Taylor ("Taylor") discloses an accumulation conveyor 10 that is divided into a plurality of accumulating zones A, B, C, D and E, as shown in FIG. 1 of Taylor. The conveyor 10 includes a conveying surface, in this case a plurality of rollers 14, that are selectively driven under the control of a plurality of accumulation modules 20A-E that correspond to the accumulating zones. Each module 20 is capable of communication with its neighboring or adjacent module in the upstream and downstream directions through communications cables 42A-E. Photoelectric or ultrasonic or other types of sensors 28 are used to determine the presence or absence of an item or package within each of the accumulating zones. Thus, when a sensor fails to detect a package in a downstream zone, its module communicates with the upstream zone to activate its conveying surface and convey an object held therein to the downstream zone.

Despite improvements in the control systems of conveyors, conventional conveyors have other areas in which improvements are needed. For instance, problems may be encountered when the packages are not all the same length. Generally, this requires that the conveyor zones be sized to fit the largest packages being conveyed. If the large packages are few, then this results in a large amount of wasted conveyor space because the majority smaller packages do not fill each zone. Since the accumulation conveyor is essentially temporary storage, the reduction in package capacity is not desirable. Also, when the cartons are released a zone-length space is created between the cartons which reduces the throughput capability of the conveyor.

Therefore, it would be advantageous to have a conveyor system that is capable of zero pressure control of accumulation of individual cartons or packages of widely varying length. It would be further advantageous if the conveyor and control system were capable of handling packages of varying length while minimizing losses of accumulation and transportation efficiency.

BRIEF SUMMARY OF THE INVENTION

The above needs are met, and other advantages are achieved, by providing a drive controller for controlling movement of a plurality of packages by an accumulation conveyor. The drive controller is configured to determine a length of each of the packages and to coordinate driving of a number of zones needed to accommodate the package. For example, a sensor in each of the conveyor zones communicates blockage by the packages to the drive controller. The drive controller determines a sequence of blockage of the sensors in adjacent zones. Blockage of the sensor in an upstream zone before the sensor in a downstream zone indicates an oversized package that extends longer than a zone length of the downstream zone and into the upstream zone. The drive controller is configured to drive the downstream zone and upstream zone simultaneously when detecting the oversized package.

In one embodiment, the present invention includes an accumulation conveyor for moving a plurality of packages. The accumulation conveyor comprises a package measurement system configured to determine a length of each of the packages. A conveying surface is divided into a plurality of adjacent zones. A drive system is configured to independently drive each of the zones of the conveying surface. A drive controller is connected in communication with the package measurement system and is configured to determine a number of zones needed to accommodate the length of one of the packages and coordinate driving of the number of zones needed to accommodate the package.

The package measurement system may include a plurality of sensors that are configured to detect a presence of the packages in the zones. In this example, the drive controller is configured to determine the number of zones necessary to accommodate the package using the number and sequence of the sensors detecting the package. For example, the drive controller is configured to coordinate operation of the subject zone and downstream zone if the sensor of the subject zone is blocked before the sensor of the downstream zone. Alternatively, if the downstream zone sensor is blocked before the subject zone sensor, the package is only a single zone in length and the drive controller stops the subject zone to keep the package in the upstream zone from entering the occupied downstream zone.

In another embodiment, the present invention includes a sensing module for controlling the application of a drive force to a respective accumulating zone of an accumulation conveyor. The sensing module includes a body and logic circuitry housed within the body. A sensor inside or outside of the body is coupled to the logic circuitry. The sensor provides a product detect signal to the logic circuitry when a product is within its respective accumulating zone. Also included are control connections that are in communication with the logic circuitry. The control connections include an upstream product detect signal input that is adapted to receive a product detect signal downstream output from an upstream sensing module. A downstream product detect signal input is adapted to receive a product detect signal upstream output from a downstream sensing module. The control connections also include a product detect signal upstream output that is adapted to transmit a product detect signal to an upstream module. A product detect signal downstream output is adapted to transmit a product detect signal to a downstream module. A drive/no-drive force selection output of the control connections is in communication with the drive force and selectively enables and disables the drive force for the respective accumulating zone. The logic circuitry evaluates the signals to determine a sequence of the product detect signals indicating the product is longer than the respective accumulating zone and whether to output a drive or no drive force selection signal.

For example, the sensing module may be configured to coordinate output of the drive force selection signal with output of a drive force selection signal of the downstream module when the product detect signal is received from the sensor before the product detect signal upstream output is received from the downstream module.

The present invention has many advantages. For example, an oversized package is only assigned a long zone (via use of multiple zones) if it needs the additional zone or zones. Short packages only occupy the spaced required on the conveyor, i.e., a single base zone per package. When the packages are released for transport, they are singulated regardless of size allowing good control of the packages with a single base zone length in between them. Since the base zones are shorter than at least some of the packages on the conveyor, the conveyor will be more densely populated during transport than a conventional conveyor with longer zones. With a large amount of the packages being oversized packages, the conveyor may be more than 50% populated during transport, increasing throughput and efficiency.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 5 is a chart of the control logic used in the conveyor system of FIG. 1;

FIG. 9 is a diagrammatic representation of the conveyor of FIG. 6 wherein package P1 has been held at the discharge end and packages P2 and P3 have entered and traveled down the conveyor in either a singulation or slug control modes;

FIG. 10 is a diagrammatic representation of the conveyor of FIG. 9 wherein package P1 is being released with the control device set to singulation mode;

FIG. 11 is a diagrammatic representation of the conveyor of FIG. 10 releasing the package P2;

FIG. 12 is a diagrammatic representation of the conveyor of FIG. 9 wherein the packages are being released while the conveyor is in slug mode;

FIG. 13 is a diagrammatic representation of an accumulation conveyor with package P1 jammed and the other packages (P2, P3, P4) stacking up behind package P1 while the conveyor is in slug mode;

FIG. 14 is a diagrammatic representation of an accumulation conveyor illustrating use of a zone stop in accumulating zone C;

FIG. 18 is a diagrammatic representation of the accumulation conveyor of FIG. 17 with dynamic zone length function on;

FIG. 20 is a chart of the control logic for handling oversized packages used in the conveyor system of FIG. 1; and FIG. 21 is a diagrammatic representation of an accumulation conveyor of another embodiment of the present invention conveying an oversized package three zones in length with dynamic zone length allocation function on.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
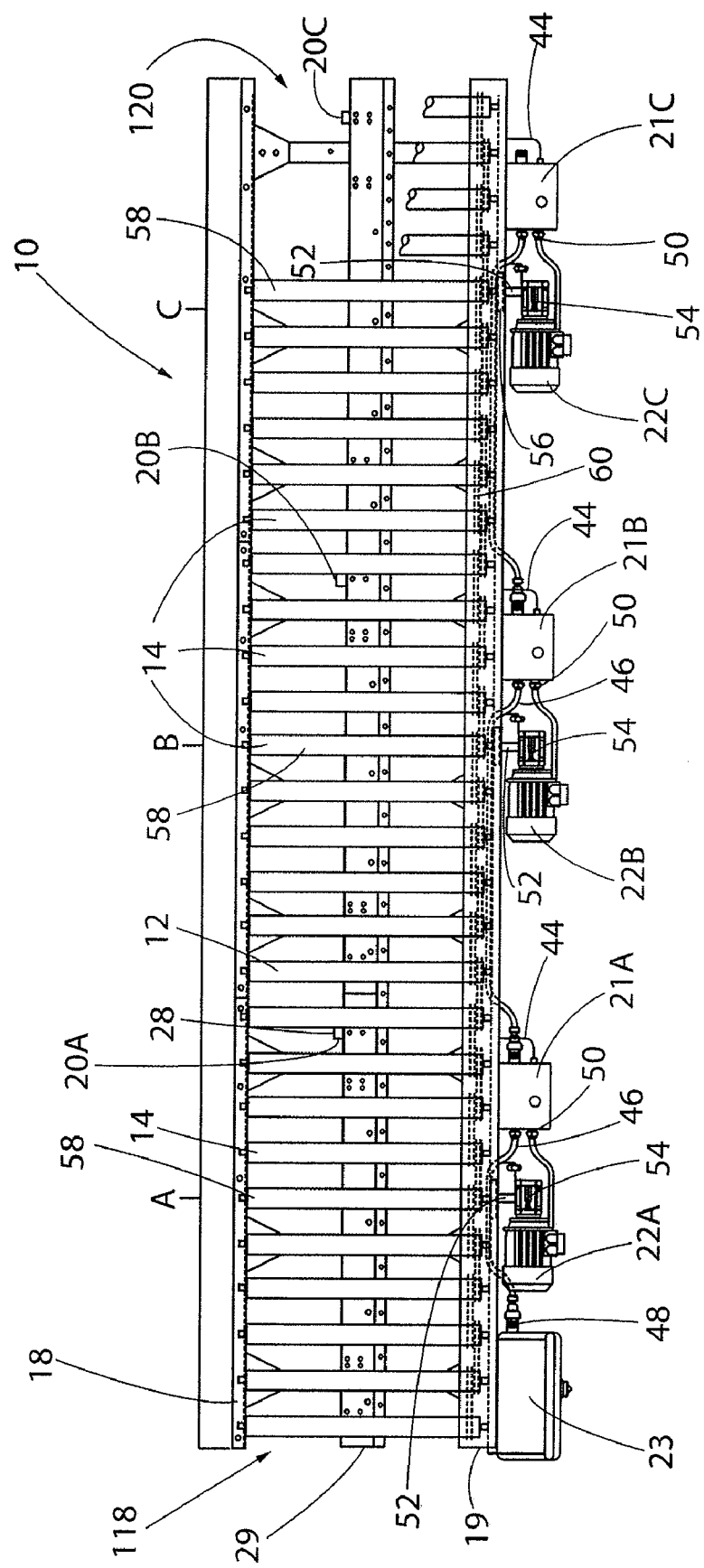
FIG. 1 is a top plan view of an accumulation conveyor system of one embodiment of the present invention wherein the conveyor has three zones.

A zero-pressure accumulation conveyor 10 includes an upper (top) conveying surface 12 and a lower (bottom) surface 13 defined, in this case, by the tops and bottoms, respectively, of a plurality of rollers 14, as shown in FIG. 1. It should be noted, however, that other types of conveying surfaces, such as belts, slats, or modular plastic belts may be used. In the case of one type of belt conveying surface the upper portion of the belt is the conveying surface that supports objects being conveyed thereon and defines the upper conveying surface 12, while the lower surface 13 is defined by the lower portion of the belt on its return trip to the drive roll. The lower surface does not typically support packages or other objects for conveyance. In addition, the lower surface may be defined by the underside of a single layered moving belt or object that moves in the downstream direction and also defines the top conveying surface, but has no return portion.

The conveyor 10 is divided into a plurality of accumulating zones identified by the letters A, B and C such that there are three accumulating zones. The conveyor 10 has a direction of product flow over the upper conveying surface 12 which is arbitrarily chosen as from accumulating zone A towards accumulating zone C. Therefore, accumulating zone A is the first accumulating zone, generally known as the infeed end accumulating zone, while accumulating zone C is the last accumulating zone, generally known as the discharge end accumulating zone.

Figure 2:
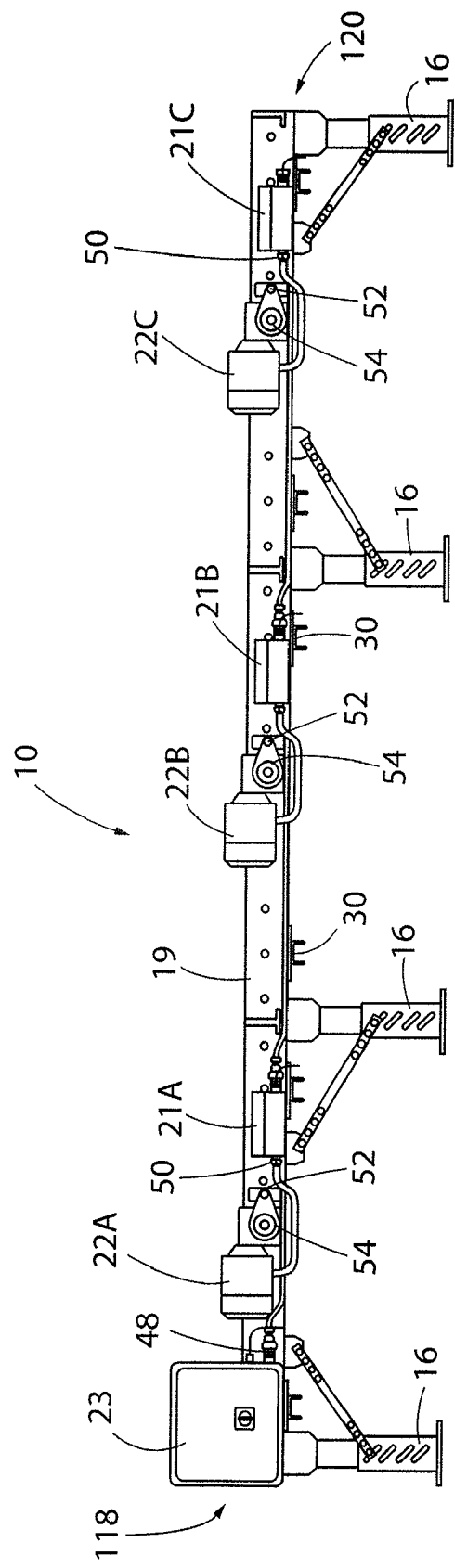
FIG. 2 is a side elevation view of the conveyor system of FIG. 1.
Figure 3:
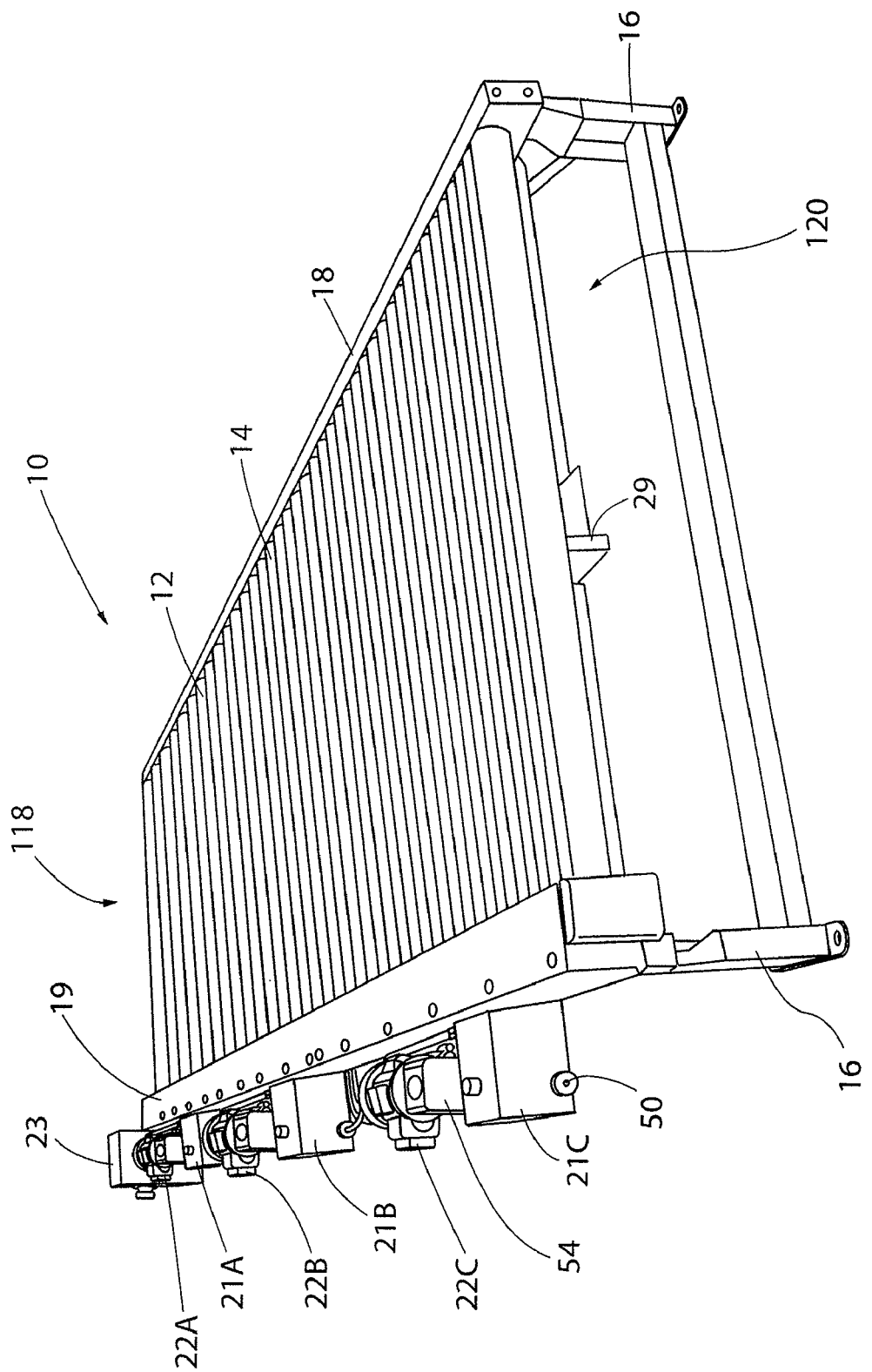
FIG. 3 is a plan view of the conveyor system of FIG. 1 as seen from its discharge end.
Figure 4:
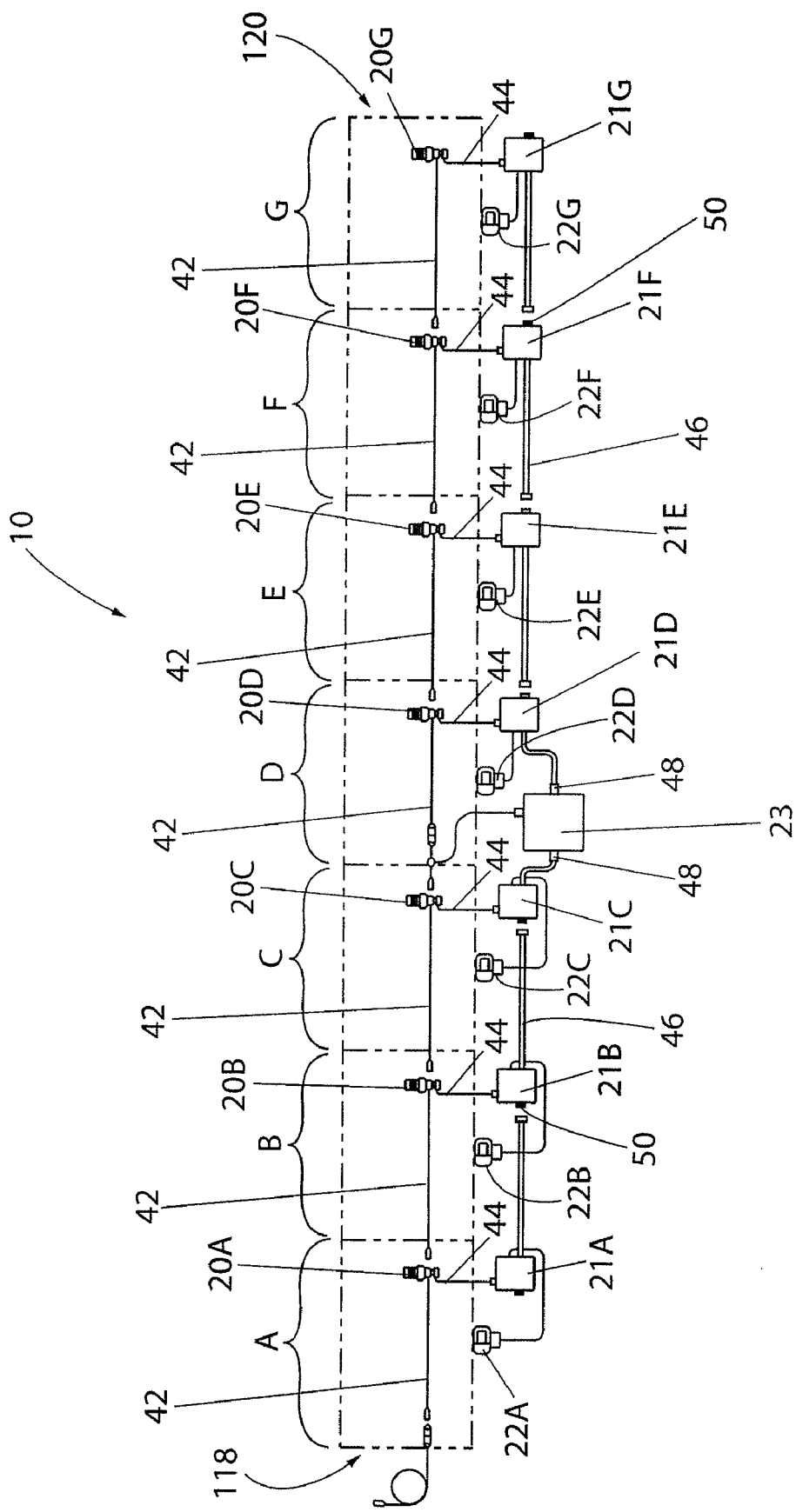
FIG. 4 is a schematic wiring diagram of a conveyor system of another embodiment of the present invention wherein the conveyor system has seven zones.

It should be noted that the number of zones illustrated in FIGS. 1-3 is arbitrary as there could be any number of accumulating zones depending upon the overall length of the particular conveyor or other conveyor design considerations. For instance, an alternative embodiment of the present invention illustrated in FIG. 4 shows a conveyor 10 having seven zones labeled A through G. As yet another example, embodiments of the present invention illustrated in the remaining FIGS. 6-14 show a conveyor 10 having five zones labeled A through E.

Referring again to FIGS. 1-3, the rollers 14 are rotatably supported between a first side rail 18 and a second side rail 19 which are in turn supported by legs 16. Positioned below the rollers 14 is a center rail 29 that extends between and parallel to the side rails 18, 19. The center rail 29 is supported in its position by a plurality of channels 30 fixed to the underside of the rails 18, 19 and extending therebetween in a cross-conveyor direction. Together, the side rails 18, 19, 29, channels 30 and legs 16 form a conveyor support frame. It should be noted, however, that the structural and mechanical aspects of the conveyor system 10 may be varied and still accomplish the task of controlled, zone-based conveyance of the packages or loads to accomplish the objectives of the present invention of handling varying length packages. Therefore, the structure of the illustrated embodiments should not necessarily be considered limiting of the scope of the present invention.

The side rail 19 supports a plurality of zone controllers 21A, 21B and 21C and a plurality of drive motors 22A, 22B and 22C. Each controller is paired with an adjacent one of the drive motors, with each controller/drive motor pairing positioned in a respective one of the zones A-C, as is indicated by the reference numbers. Side rail 19 further supports a disconnect and power supply panel 23 which is positioned in the embodiment illustrated in FIGS. 1-3 in zone A. In the embodiment illustrated in FIG. 4, alternatively, the power supply panel 23 is in zone D. Center rail 29 supports a plurality of accumulation logic modules designated 20A, 20B and 20C and also corresponding to the accumulating zones A-C. As shown best by the embodiment illustrated in FIG. 4, each logic module 20 is supported beneath the rollers 14 in its respective one of the zones A-C at approximately the downstream end of the zone for reasons described more fully below.

Figure 15:
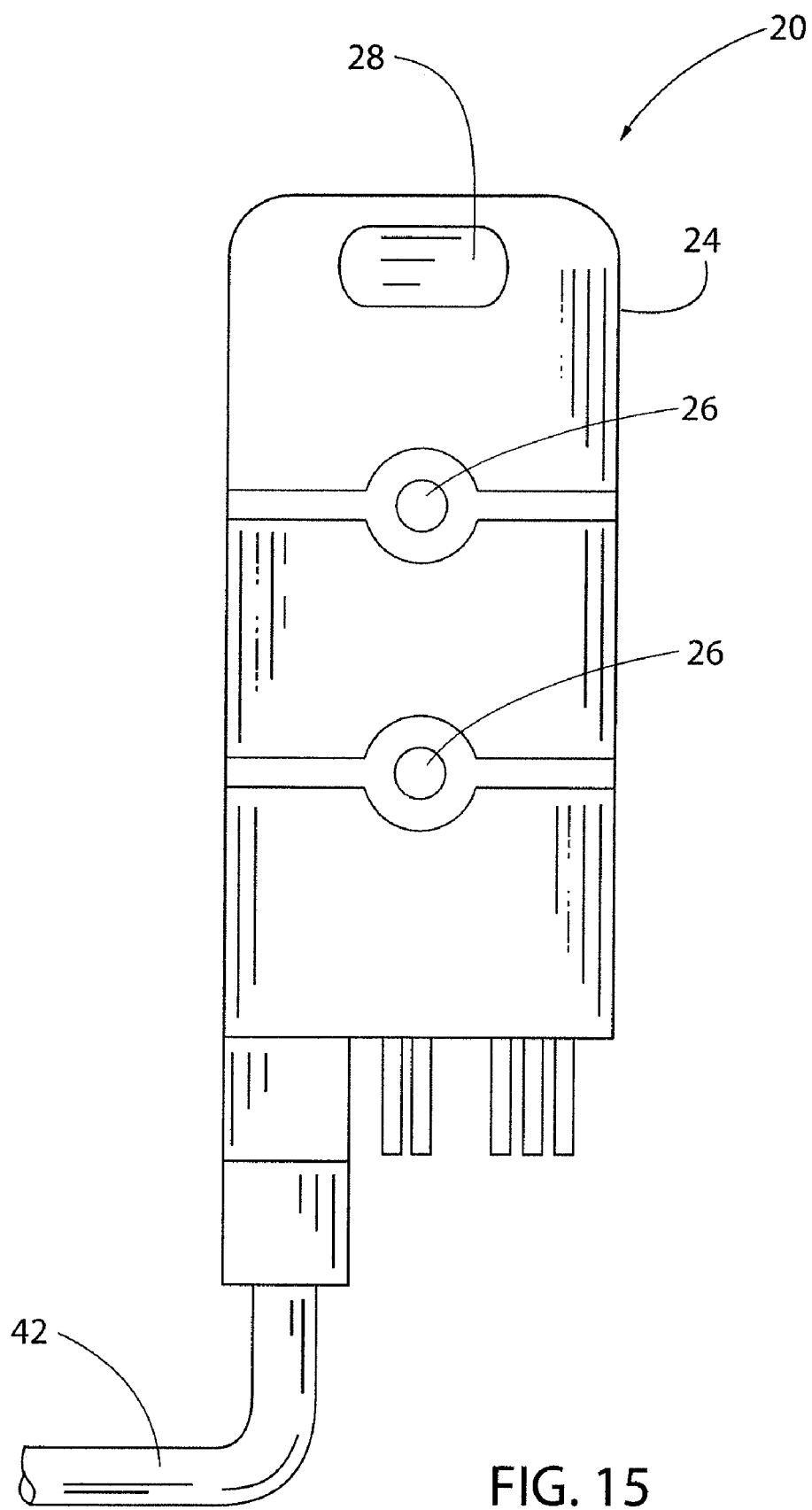
FIG. 15 is a control logic module of another embodiment of the present invention.

Each logic module 20 includes a housing or casing 24 that encloses electrical logic circuitry (as shown in FIG. 15) that receives various input signals and transmits various output signals based on internal evaluations as per the exemplary chart in FIG. 5. The logic circuitry may include a microprocessor and other components, or may be another type of logic structure that will perform the functions described below.

The casing 24 of each module 20 includes a pair of bores 26 extending therethrough that allow the casing to be mounted to a center rail 29 underneath the rollers or conveying surface 12 of its respective one of the zones, as shown in FIGS. 1, 4 and 15. The center rail is aligned with, and positioned between, the side rails 18 and 19. Each module 20 further includes a sensor 28 on an upward face so that a field of view of the sensor extends between a pair of the rollers 14. Each sensor 28 is in communication with the logic circuitry of the module 20 in its respective zone and the modules in the upstream and downstream zones via the module communication lines 42.

The sensor 28 is used to determine the presence or absence of an item or package within the respective accumulating zone and to send a signal to its respective logic circuitry indicating the same. The sensor may be a photoelectric sensor, a proximity sensor, an ultrasonic sensor, or any other type of sensor that is capable of detecting the presence or absence of an item within the respective accumulating zone and providing a signal indicative of the same to the logic circuitry. Different types of sensors, and different types of conveying surfaces, may require different positioning of the sensors. For instance, each sensor 28 may be mounted on one of the side rails 18, 19 and have a field of view in the cross-conveyor direction. Such side mounting would be advantageous when belt conveying surfaces are used because the belt would otherwise block the view of a sensor mounted under the conveying belt surfaces.

Each logic module 20 is in communication with its neighboring or adjacent module, both in the upstream direction and the downstream direction relative to conveyor flow, where possible, through communications cables 42. Therefore, module 20B is in communication with upstream module 20A and downstream module 20C, as shown in FIG. 1 (only a portion of each module is visible due to the presence of the center rail 29). On the other hand, accumulating zone A is only in communication with its adjacent downstream module 20B, while accumulating zone C is only in communication with its adjacent upstream module 20B. Communication of the logic module 20 of the first and last zones would be the same for conveyors of other lengths, such as zone A in the seven-zone conveyor of FIG. 4 being only in communication with downstream zone B, and zone G being communication only with upstream zone F, while the intervening zones are each in communication with the logic module of both the upstream and downstream zones.

Each zone controller 21 has logic circuitry specific to controlling the operation of a respective one of the motors 22 in its zone. Each controller 21 includes a pair of power connections 50 on its upstream and downstream sides. Attached to the power connections 50 are power supply lines 46 that connect the controllers in a series ending in the power supply panel 23. Notably, the zone controller 21 at a discharge end 120 has an open power connection (zone C in the embodiment illustrated in FIG. 1) that allows the addition of further downstream zones for longer conveyors. In addition to being able to switch its respective motor 22 on and off, each zone controller 21 is further capable of varying the speed of each motor, such as by controlling the amount or frequency of power supplied to each motor. Such power control allows for a "soft start" wherein the motor, and hence conveying surface 12 speed, is gradually increased. Beyond soft starts, the overall speed of each motor 22 can be controlled to control throughput of conveyed objects (e.g., packages) and to further facilitate zero-pressure accumulation.

The power supply panel 23 may include one, or more, connections 48 for attachment of the corresponding number of power supply lines 46, allowing the panel to be positioned in any selected upstream (single output as shown in FIG. 1) or downstream position with controllers 21 in either, or both (dual output as shown in FIG. 4), the upstream and downstream directions. The power supply panel 23 is a 208/230 volt, 3 phase, 60 Hz power supply for 1-5 zones at single output, or 1-10 zones at dual output. The zone capacity may be doubled with a 460 volt, 3 phase, 60 Hz motor for 1-10 zones at single output, or 1-20 zones dual output. Despite the aforementioned preferences, the voltage rating, and other capabilities, of the power supply panel 23 can be changed to suit increased zone and load requirements of the conveyor and, in particular, increased capacity of the drive motors.

Each drive motor 22 could be 208, 230 or 460 volt, ½ horsepower motor that has a torque rating of at least 100 in-lb and preferably about 687 in-lb (for a conveyor load rating of 3,000 lb), or even higher depending upon the desired loads to be moved by the conveyor. Such motors have a life expectancy when used in the present system of about 100,000 hours which is advantageous for low-maintenance and downtime on conveyors that experience heavy use and move heavy loads. Each drive motor 22 also includes a drive shaft 52, and, if necessary, a gearbox or reducer 54 for reducing the output speed of the drive motor at the shaft 52. The reducer 54 illustrated in FIG. 1 also allows mounting of the motor at a right angle to the machine direction for a lower profile than a straight-mounted motor. Reducing the profile of the motor is advantageous due to the large size of the motors necessary to drive higher conveyor loads.

The conveyor system 10 of the present invention also has a drive assembly that includes a non-slip coupling 56 that connects the end of the motor shaft 52 to a driven roller 58 of the rollers 14. The remaining ones of the rollers are slaved to the driven roller 58 by a chain drive system wherein individual chain loops 60 extend about sprockets fixed to adjacent pairs of the slaved rollers. In this manner, driving of the driven roller 58 by the motor 22 also drives the remaining rollers 14 and causes objects supported on the rollers to move in the upstream or downstream direction. Of course, with the use of alternative conveying surfaces, chain drives may not be necessary, or optimal, such as with belt conveyors. In a belt conveyor, the driven roller drives a belt wrapped around a second, non-driven roller and the length of belt between the rollers defines the zone. Such an alternative conveying surface, however, would still benefit from the use of a non-slip coupling which has several advantages independent of the type of conveying surface.

Advantageously, unlike conventional drive systems, the conveyor 10 does not require extended chains, belts or shafts because power from a single motor need not be transmitted along the entire conveyor. In addition, the present conveyor system does not require the use of clutches to selectively transmit power to the different zones. A non-slip transmission system allows greater amounts of the power generated by the motor 22 in each of the zones to be transmitted to the conveying surface 12 (thereby increasing conveyor load capacity), reduces the noise associated with clutch engagement and eliminates the dust generated by clutch-driven systems. Particularly advantageous is a combination of the non-slip transmission with the soft-start, variable power control of the zone controllers 21A-C which replaces the hard start caused by relatively low slip clutches. Notably, non-slip is used herein to refer to connections in which no slip occurs, which excludes even low-slip clutches. Non-slip also excludes other apparatuses that experience slip during power transmission, such as fluid power transmissions.

Non-slip couplings and transmissions can include hard connections, wherein the drive shaft 52 of the motor 22/reducer 54 is coupled directly to the driven roller 58, such as by a collar or key and slot combination. Alternatively, a soft coupling, such as an elastic or flexible coupling, may be used that transmits power without slip, but facilitates a soft-start of the upper conveying surface 12. In addition, a combination of connections could be used to form a non-slip coupling or connection between the driven roller 58 to the drive shaft 52 if space constraints dictate that the motor be placed in an irregular position. For instance, the drive motors 22 could be placed beneath the lower conveying surface (i.e., below the plurality of rollers 14 in the illustrated embodiments) in each of the zones A-C so as to minimize the lateral profile of the conveyor 10. Of course, such a motor placement would limit the length of the legs 16 and inhibit conveyor configurations wherein the upper conveying surface 12 is very close to the floor.

Figure 16:
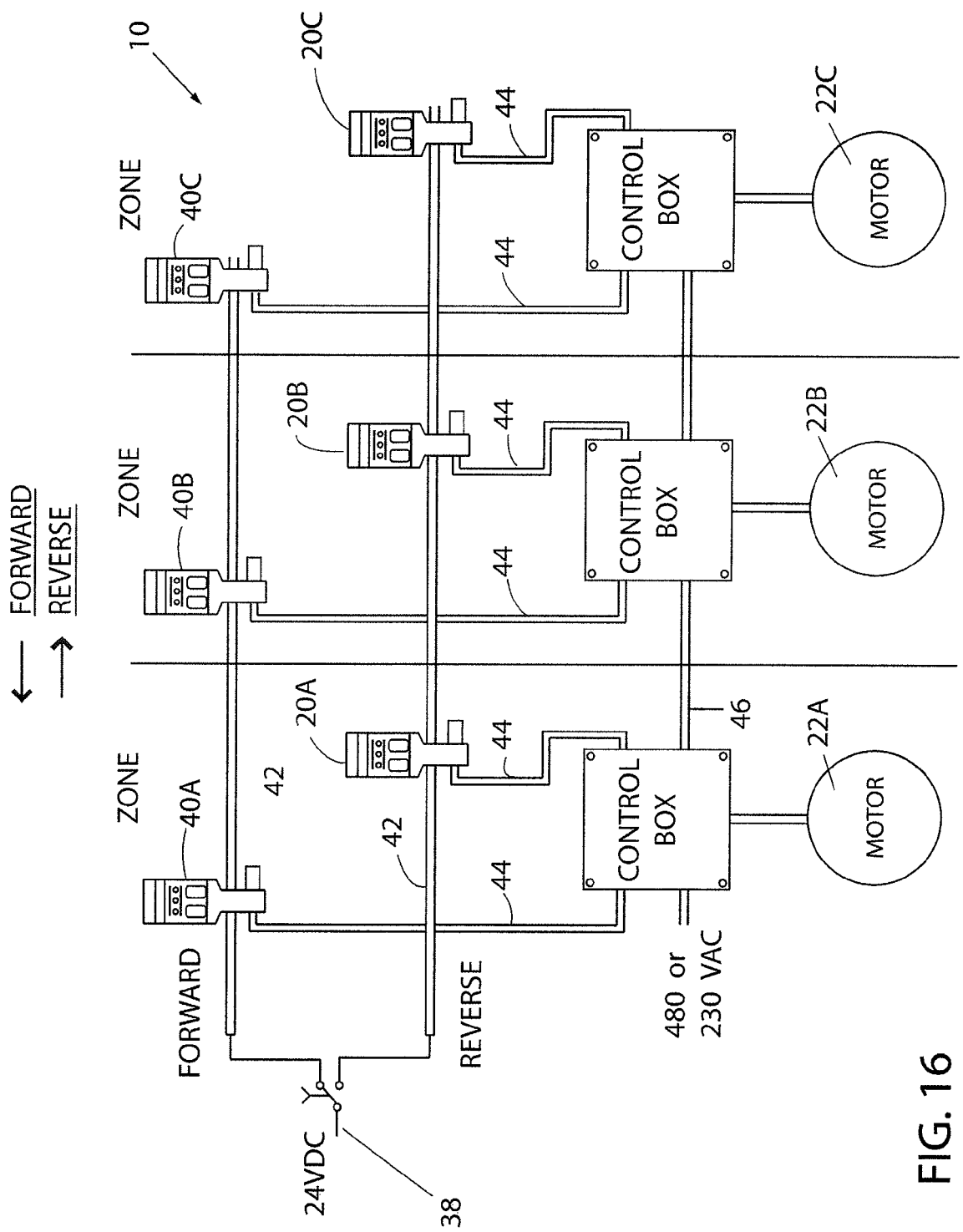
FIG. 16 is a schematic of several of the control logic modules of FIG. 15 connected to form a control system of another embodiment of the present invention.

The aggregation of accumulation modules 20A-C and controllers 21A-C of FIGS. 1-3 constitute an accumulation control device or system (as, for example, shown in FIG. 16) that works in conjunction with the drive motors 22 and associated non-slip drive couplings to control the flow of packages along the conveyor. In response to inputs from the logic circuitry of each module 20, each zone controller 21 is capable of switching its respective drive motor 22 on and off by controlling the power supplied to the drive motor. Therefore, each of the zones A-C may have its drive motor 22 individually controlled via input from its respective controller 21 and logic module 20. Optionally, the controller 21 and/or logic module 20 may be further configured to determine when the drive motor is experiencing overload and to shut off or reduce power to the motor 22.

It should be noted that although accumulation control is embodied in circuitry in separate modules and controllers in the illustrated embodiments, such circuitry could be combined in a single unit. Also, it should be noted that the modules and controllers could also be embodied in software, hardware, firmware, or combinations thereof and still execute accumulation control. However, the positioning and hardware circuitry of the embodiments illustrated (and other embodiments wherein the control logic and power control system for each zone is contained within the zone and easily connectable to upstream and downstream zones) herein are preferred for reasons of durability and the ease of adding additional zones, or combining zones, to increase the length of the conveyor system.

The logic circuitry flow of the various inputs and outputs of each module 20 is depicted in the aforementioned chart of FIG. 5. The chart of FIG. 5 illustrates the zone output (either RUN or STOP) of a module 20 based on the state of the subject zone's sensor 28, the sensor 28 of a downstream module 20, the subject zone's stop input state, and a downstream zone output state.

In combination one, when the subject module sensor 28 is CLEAR and the downstream module sensor 28 is also CLEAR, and the zone stop input is OFF, the subject module zone output state is RUN. A BLOCKED state of the subject module sensor 28 in combination two still results in a RUN for the module zone output state. So does a CLEAR state of the subject module sensor 28 and BLOCKED state of the downstream sensor 28 in combination three. Notably, combinations one, two and three depict uninhibited movement of a zone-sized or smaller package's movement with the subject zone input state OFF. The subject module is configured, however, to change its output state to STOP if the downstream sensor state is BLOCKED, as shown in combination four.

Combinations five, six, seven and eight illustrate zone outputs of the subject zone module 20 with the subject zone stop input state ON. Combination five shows the subject module sensor 28 as being CLEAR and the downstream sensor as being CLEAR, with the resultant output of the subject module zone output being RUN. In combination six, the subject module sensor 28 is BLOCKED and the downstream sensor state is CLEAR, the subject module zone output state is STOP. Thus, a package in the subject zone is stopped in response to the subject zone having the stop input state ON. In combination seven, the subject module sensor 28 is CLEAR and the resulting subject module zone output state is RUN, even when the downstream sensor is BLOCKED. Finally, with the subject module sensor 20 state being BLOCKED and the downstream module sensor 20 being BLOCKED, the subject module zone output state is STOP.

With reference now to FIGS. 6-14, operation of the accumulating conveyor 10 will be described relative to zone or smaller-sized packages entering the accumulating conveyor, being carried down the conveyor, and being discharged from the conveyor, when the control device is in the singulation mode, the slug mode, and the various features associated therewith. It should initially be understood that, 1) in FIGS. 6-9, the sequence of events are applicable to both the singulation mode and the slug mode; 2) in FIGS. 10 and 11, the sequence of events apply to the singulation mode only; 3) in FIGS. 12 and 13, the sequence of events are applicable to the slug mode only; and 4) in FIG. 14, the sequence of events applies to both the singulation and slug modes.

Figure 6:
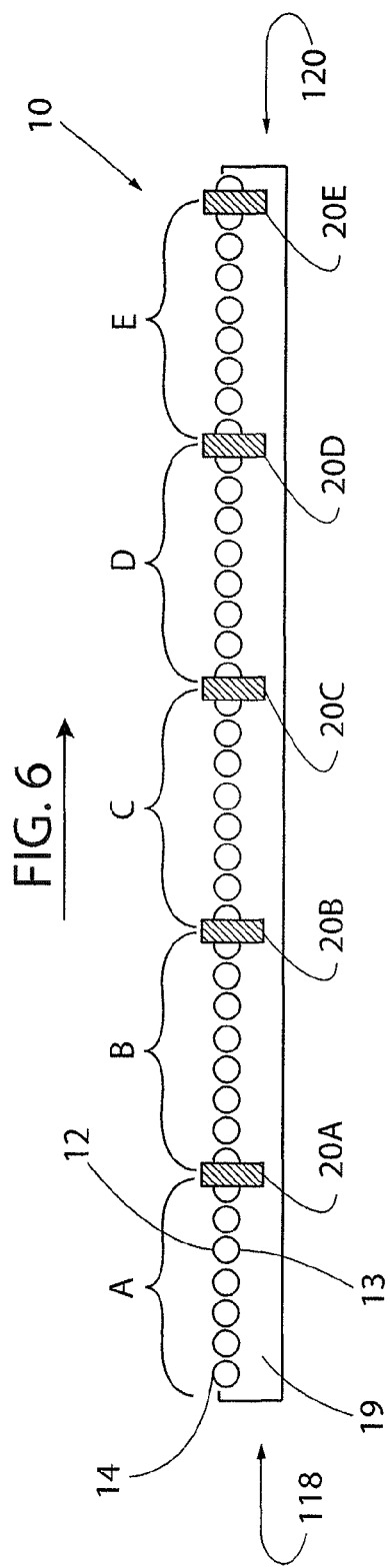
FIG. 6 is a diagrammatic representation of an empty accumulating conveyor of another embodiment of the present invention wherein the conveyor has five zones.
Figure 7:
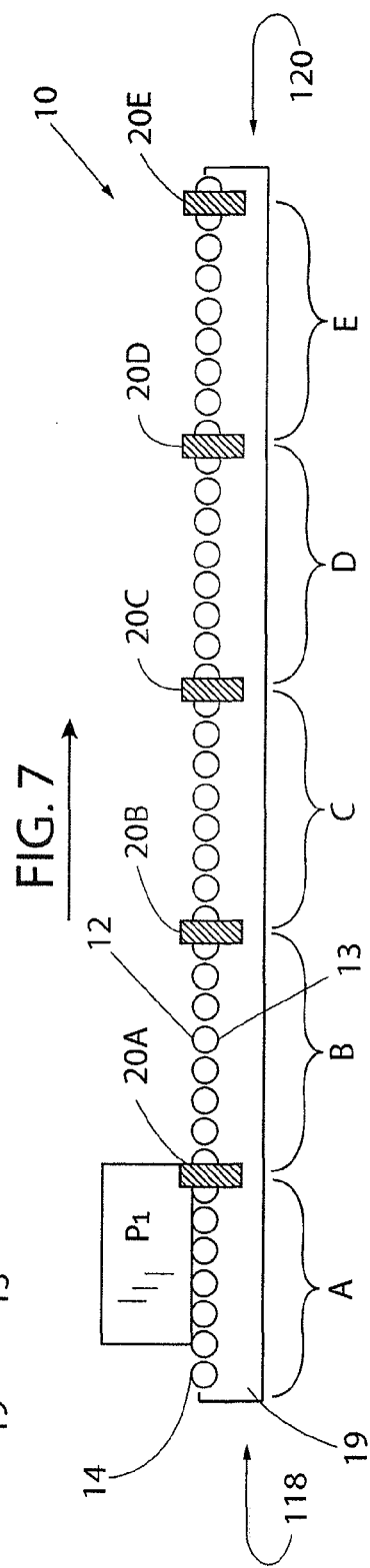
FIG. 7 is a diagrammatic representation of the conveyor of FIG. 6 with a package P1 at an infeed end and in either a singulation or slug control modes.

FIG. 6 depicts an empty accumulating conveyor 10 having five zones A-E with zone A at an infeed end 118 and zone E at the discharge end 120. The conveyor has no packages thereon and is thus empty. Zones B-E are sleeping (not running) assuming the sleep mode is enabled, indicating that there has not been any package for the set time period. Zone A however, is set to sleep mode disabled such that zone A is running in order to convey a package to the discharge of zone A and begin the "waking up" process. Zone E has its zone stop setting to active to cause the first package to reach zone E to be stopped therein. In FIG. 7, a package P1 has entered zone A. Upon detection of the package P1 in zone A by the module 20A, a product detect signal is sent to the adjacent downstream module 20B. Upon receipt of a product detect signal from the adjacent upstream module 20A, module 20B transmits a drive signal to its controller 21 to "wake up" the motor 22 and the zone. Thus, the package P1 is transported from zone A into zone B.

Figure 8:
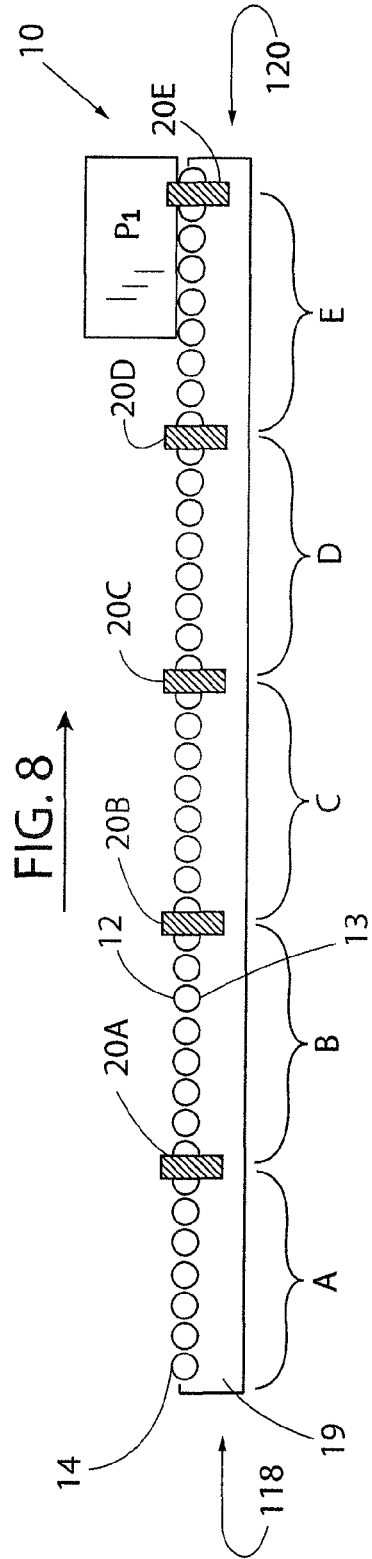
FIG. 8 is a diagrammatic representation of the conveyor of FIG. 6 with the package P1 having traveled to a discharge end in either a singulation or slug control modes.

Referring to FIG. 8, the package P1 has been transported all the way to zone E, the discharge zone. Each adjacent module from module 20B, in other words modules 20C and 20D, have run through the same sequence as described between modules 20A and 20B. However, when the package P1 reaches zone E, module 20E being set to zone stop enable, transmits a no drive signal to its controller 21 and drive motor 22 to stop the drive force in zone E. The module 20E simultaneously sends a product detect signal to the adjacent upstream module 20D. Zones D and C are still in the zone running state as their sleep timers will not yet have expired, while zone B is in the sleep mode as its sleep timer will have expired.

Assuming, that immediate discharge of package P1 from the conveyor 10 is not desired, FIG. 9 depicts the situation where two more packages P2, P3 have entered the conveyor. Package P2 travels down the conveyor as described above until it detected by module 20D. Since module 20D has already received a product detect signal from the adjacent downstream module 20E, the detection of the package P2 within its zone (zone D) will cause the module to transmit a no drive signal to stop its zone (again, zone D). Module 20D also sends a product detect signal to its adjacent upstream module 20C, and to its adjacent downstream module 20E. As package P3 travels down the conveyor 10 it is detected by module 20C. Since module 20C has already received a product detect signal from the adjacent downstream module 20D, the module 20C outputs a no drive signal to stop the zone, zone C. Module 20C also transmits a product detect signal to the adjacent upstream module 20B and to the adjacent downstream module 20D. Also, since no packages have entered the conveyor 10, zone B has gone to sleep.

Again, the sequence of events described above with reference to FIGS. 6-9 are applicable to both the singulation mode and the slug mode. If the zone E module 20E were not set to zone stop, the products would be discharged from the conveyor regardless of the mode, unless the products were too close together while in the singulation mode. In the singulation mode, the packages would momentarily stop within the zones to provide the proper spacing.

Referring to FIGS. 10 and 11, the discharge of packages from the conveyor will be described when the control device is set to the singulation mode. When it is desired to discharge the packages from the conveyor, the zone stop input to module 20E is disabled or set to inactive. This will cause the module 20E to send a drive signal to start the respective zone running since the module 20E will not be receiving a product detect signal from an adjacent downstream module in addition to the current product detect signal from its own sensor, because there is no downstream module. As the package travels along zone E, the module 20E will continue to send a product detect signal to the adjacent upstream module 20D until the entire package has cleared the module 20E.

Since module 20D is still receiving its own product detect signal and a downstream product detect signal, zone D remains stopped. This produces a gap between the packages approximately equal in length to the length of the zones, hence the term singulation. Once however, the package P1 has cleared the module 20E, the module 20E stops sending a product detect signal to the adjacent upstream module 20D causing the module 20D to send a drive signal to start the drive motor 22 for its zone, zone D. The package P2 continues to advance through zone D while zone C is still stopped since the zone D module 20D is still detecting a package. As the package P2 clears the module 20D, the product detect signal to the adjacent upstream module 20C ceases allowing the package P3 to begin its travel down the conveyor. The package P2 is discharged from the conveyor as explained above with reference to package P1, likewise with package P3.

FIG. 12 depicts the release of packages after accumulation in FIG. 9 when the conveyor is in the slug mode. The zone stop input to module 20E has been set to inactive causing module 20E to change zone E to a running state, in turn causing zone E to begin discharge of package P1. In contrast to the singulation sequence, module 20E will not immediately send a product detect signal to the adjacent upstream module 20D even though a package P1 is still being detected by the module 20E, but instead starts the jam timer. If package P1 is still being detected by module 20E after the jam timer has expired, the product detect signal is then sent to the adjacent upstream module 20D.

Typically, the package P1 will have been discharged from the conveyor and thus will have traveled past the module 20E before the expiration of the jam timer, and thus the product detect signal is never sent to the adjacent upstream module 20D. At this point, since module 20D is no longer receiving a product detect signal from the adjacent downstream module 20E, zone D becomes active through the module 20D outputting a drive signal, thus advancing package P2. This process continues upstream until the packages have been discharged from the conveyor.

In FIG. 13, the jam protection feature is demonstrated as it applies to the slug mode. Package P1 is shown as being jammed between zones C and D, and is being detected by module 20C. Upon detection of package P1, module 20C begins the jam timer (in addition to sending a product detect signal to the adjacent downstream module 20D). Since the package P1 is jammed, the timer will expire (time out) thus, causing the module 20C to send a product detect signal to the adjacent upstream module 20B. While the jam timer for module 20C was operating, packages P2 and P3 were driven into the jammed package P1. When module 20B receives the product detect signal from the adjacent downstream module 20C, it will generate a no drive signal to stop the zone (zone B). Module 20B which is detecting package P3 also sends a product detect signal to the adjacent upstream module 20A, bypassing the jam timer in module 20B. When the package P4 then is detected by the module 20A, a no drive signal is generated by the module 20A to stop the zone A from running. Once the jammed package P1 is dislodged or removed, the conveyor returns to the normal slug mode state.

Again, with the jam protection enabled while in the slug mode, if a package becomes jammed at any zone for a predetermined time period (e.g. 6 seconds) or longer, packages on the upstream side of the jammed package will stop in sequence until the jammed package is dislodged or removed. The zone containing the jammed package will continue to drive, in many cases dislodging the jammed package without outside help. The zones will return to normal operating mode once the jam is cleared.

Finally, with reference to FIG. 14, the use of a zone stop wired in the middle of the conveyor is illustrated. In this instance a switch has been connected to the appropriate connections of module 20C in order to make module 20C a zone stop. By setting the zone stop input of module 20C to active, module 20C is set up to stop the package P1 when it enters zone C. Packages P2 and P3 stop in zones B and A in accordance with the sequence described with reference to FIG. 9.

With reference now to FIGS. 17-21, operation of the accumulating conveyor 10 in another embodiment of the present invention will be described relative to oversized packages (used herein to refer to packages larger than the smallest zone) entering the accumulating conveyor, being carried down the conveyor, and being discharged from the conveyor, when the control device is in the singulation mode.

Figure 17:
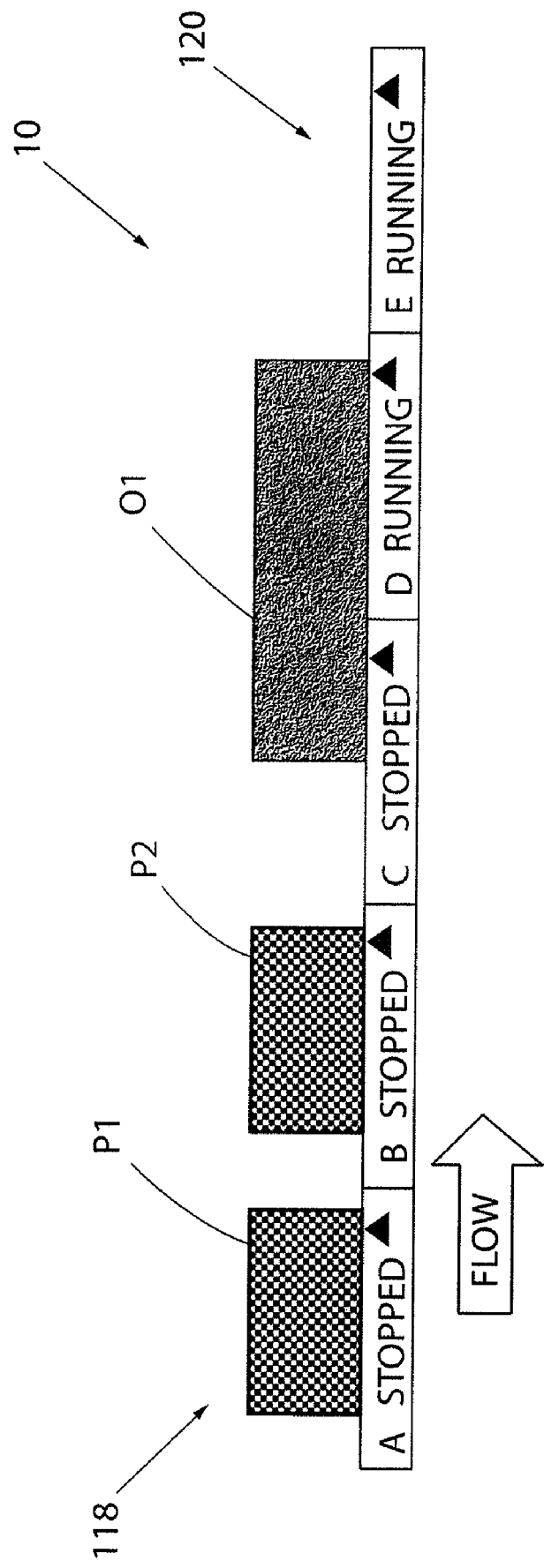
FIG. 17 is a diagrammatic representation of an accumulation conveyor of another embodiment of the present invention conveying an oversized package with dynamic zone length allocation function off.

FIG. 17 illustrates the accumulating conveyor 10 with five zones A-E, zone A being at the infeed end 118 and zone E at the discharge end 120. Three packages are on the conveyor, P1 and P2 are smaller than the zone size and O1 is an oversized package. Each of packages P1 and P2 occupy zones A and B, respectively and are contained within those zones. Package O1, on the other hand, occupies all of zone D and a front portion of zone C. Zone E is empty.

Without the dynamic zone length allocation function of the present invention, Zone A is stopped because it is receiving a detect package signal from the downstream module 20B, and Zone B is stopped because it is receiving a detect package signal from the downstream module 20C. Zone C is also stopped, even though only partially full, because its module 20C detects the upstream portion of the package O1 and the downstream module 20D detects the downstream portion of the package O1. Notably, Zone D is running because the downstream module 20E does not detect a package in Zone E, but with Zone C not running, Zone D has to drag the upstream portion of the package O1 out of non-moving Zone C.

Figure 18:
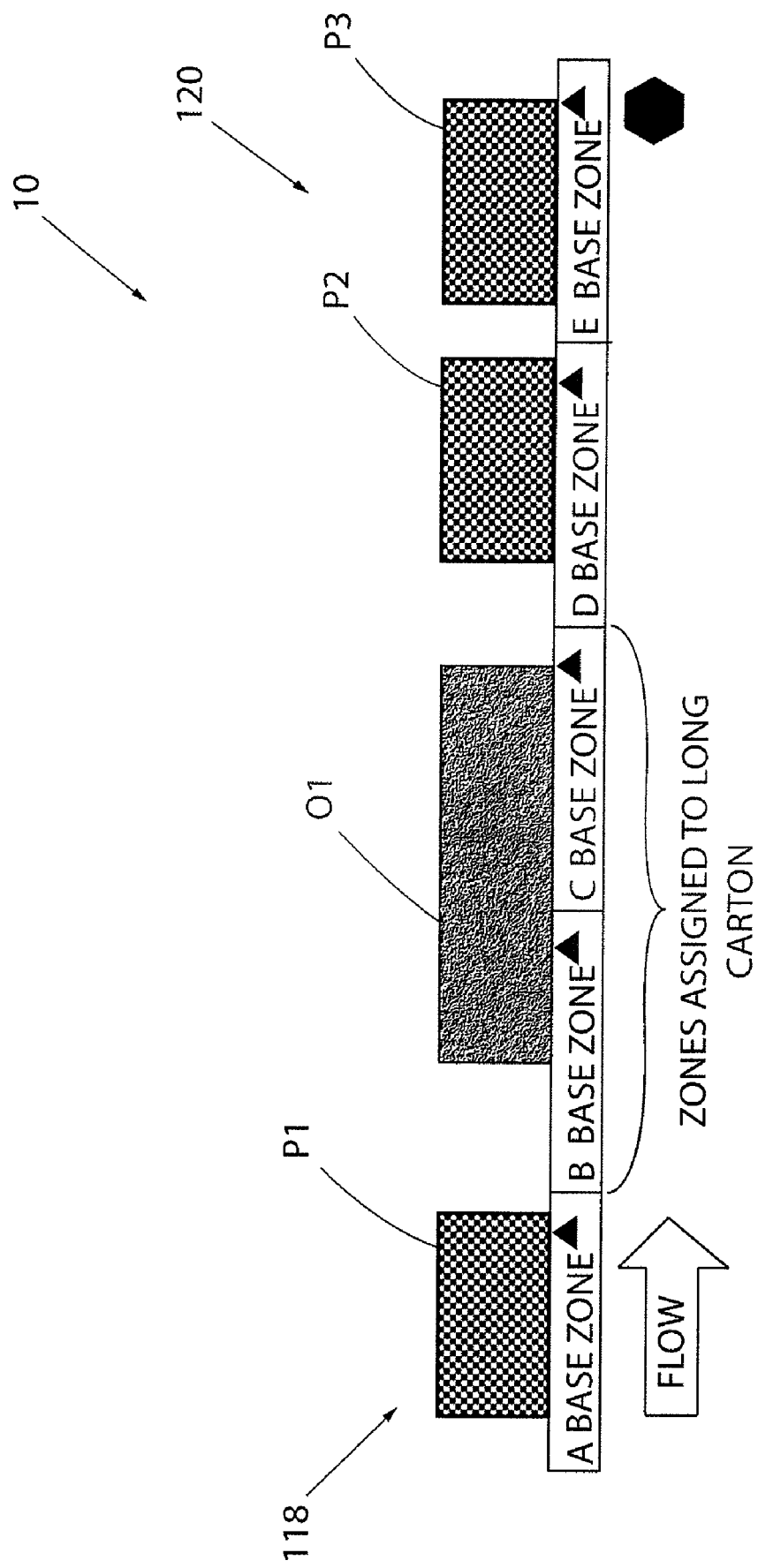

With the dynamic zone length allocation function activated, the size of the package O1 is determined as it travels down the conveyor 10 and additional zones are assigned to handling the package O1 depending upon the number of zones it needs to accommodate its length. For example, as shown in FIG. 18, if the base zone length of the conveyor 10 is twelve inches, and the package O1 is twenty inches long, the modules 20 will assign two base zones to the package O1. This provides an effective zone length of twenty-four inches for the package O1.

All of the zones (in the illustrated embodiment two zones) allocated to the package O1 are driven together as the package O1 is being transported. For example, as shown in FIG. 18, when downstream zones D and E have accumulated packages or when a zone (e.g., Zone C) is reached that has a zone stop activated, all of the zones (e.g., Zones B and C) allocated to the package O1 will remain stopped until downstream packages are clear of the downstream one of the zones.

Figure 19:
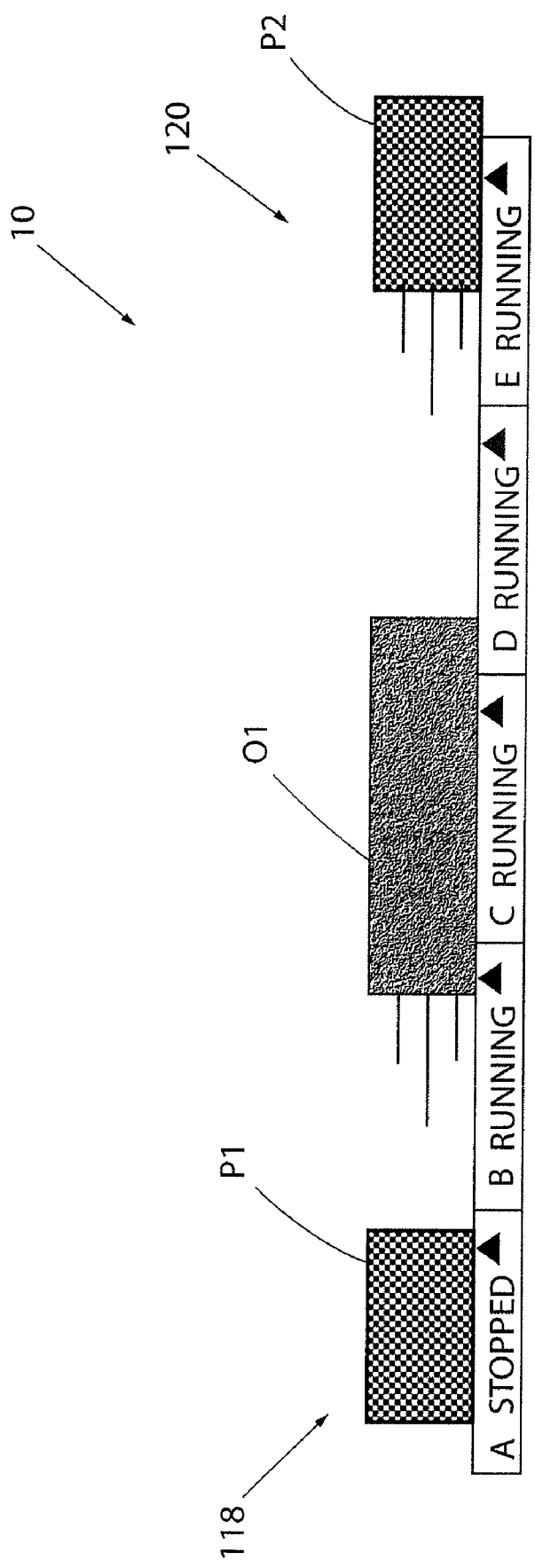
FIG. 19 is a diagrammatic representation of the accumulation conveyor of FIG. 18 with zones assigned to the oversized package running in coordination.
Figure 21:
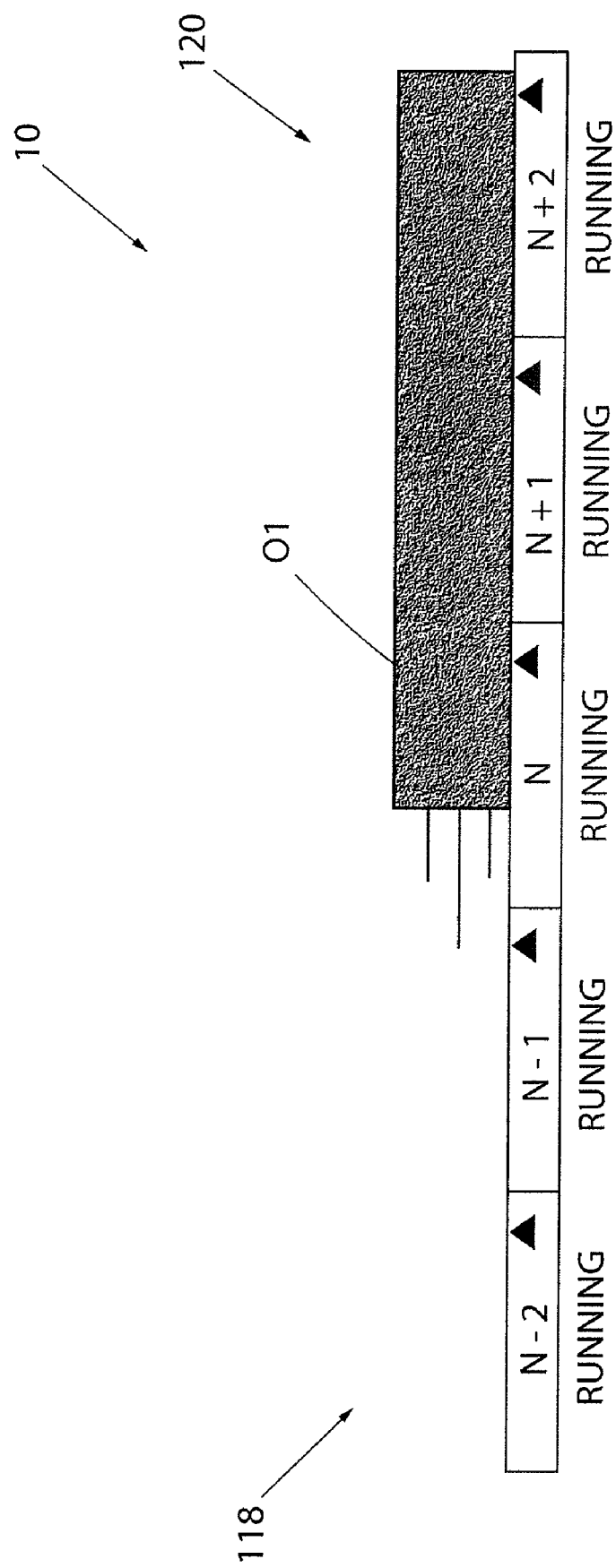

When the zone stop signal has been removed and/or the zone downstream (Zone D) from the package O1 has been released and begins to drive, as shown in FIG. 19, all of the zones occupied by the package O1 remain stopped until the package P2 is completely clear of the downstream Zone D. At that point, all of the zones (Zones B and C) occupied by the package O1 begin to drive and the package advances into the downstream Zone D. If there is a package (e.g., P1 in FIG. 19) accumulated upstream of the package O1, any zones (e.g., Zone A) will not advance until the package O1 has cleared the most upstream zone (e.g., Zone B) it was occupying.

Handling of the oversized packages is enabled by the independent control of the zones of the conveyor 10 and the functional logic of the modules 20. Generally, in one embodiment of the present invention, the modules are configured to monitor the outputs of the module of an occupied zone and an immediately downstream zone, including 1) the state of the sensor 28 of the subject zone or module, 2) the state of the sensor 28 in the zone or module immediately downstream, 3) the state of the zone stop input of the subject zone or module and 4) the state of the zone output of the module immediately downstream. In addition to being configured to monitor these output states, the modules 20 are also configured to monitor the order or sequence of changes in the output states.

The modules 20 are configured to detect the difference between two or more different packages, each in one of a pair or more of adjacent zones, and one long package spanning multiple zones, by detecting the sequence in which the sensor 28 in each of the zones is blocked. If two packages are being detected, the downstream sensor 28 will become blocked before the immediately upstream sensor 28. In this case, the upstream module 20 output should be set to STOP. However, when an oversized package O1 is moving, the upstream sensor 28 will become blocked before the immediately downstream sensor 28. In this instance, the upstream module 20 (or modules if the oversized package O1 is greater than two zones in length) should be matched with that of the downstream module 20.

The dynamic zone length logic circuitry flow of the inputs and outputs of each module is depicted in the chart of FIG. 20. In particular, the chart of FIG. 20 illustrates the zone output (either RUN or STOP) of the subject zone and the downstream zone modules 20 based on the state of the subject zone's sensor 28, the sensor 28 of a downstream module 20, the subject zone's stop input state, a downstream zone output state and the order in which the subject and downstream sensors are blocked.

Combinations one, two, three, four-A, four-B and four-C are all configured with the subject zone stop input state at OFF. In other words, the subject zone is not under a zone stop command. Combination one has both the subject and downstream module sensors 28 clear, and the subject zone module zone output is RUN. Combination two changes the subject module sensor state to BLOCKED, but with the subject zone input state being OFF, the subject module zone output state continues to be RUN. Combination three has the subject module sensor state CLEAR and the downstream module state BLOCKED (as if the package had traveled downstream from combination two) and the subject module zone output state continues to be RUN.

Combinations four-A, four-B and four-C each illustrate logic configured to handle when the subject module sensor 28 and downstream module sensor are BLOCKED and the subject zone stop input state is OFF. Notably, in combinations four-A, four-B and four-C both the downstream zone output state and the order of sensor blockage are considered. In combination four-A, if the downstream zone output state at STOP, the subject zone output state is also STOP, thereby avoiding package collision regardless of whether detecting two regular packages or one oversized package O1. This helps ensure that shorter packages are not pushed together and longer packages are not pushed by one base zone while being held back by another.

Combinations four-B and four-C illustrate the downstream zone output state being RUN. In these combinations, if the subject module sensor is blocked first (combination four-B) the subject module zone output state is set to RUN, because this indicates an oversized package O1. Setting the subject zone output state to RUN will allow the oversized package to advance unhindered by the subject zone.

If, on the other hand, the downstream module sensor is blocked first (combination four-C), the presence of two consecutive regular-sized packages is indicated and the subject module zone output state is set to STOP. This will allow the downstream package to advance until the downstream sensor no longer detects it before the module releases its carton, similar to normal singulation mode.

Combinations five, six, seven and eight each illustrate the subject zone stop input state as ON. In these combinations, the order of sensor 28 blockage does not matter and combinations fix, six, seven and eight have the same logic as described above for FIG. 5. Essentially, the subject module zone output state is set to STOP when the subject module sensor state is BLOCKED and to RUN when not blocked.

The logic and structure of the present invention for determining the length of the packages and allocating the appropriate number of zones may vary, as long as the package length (e.g., number of sensors occupied by the package) in zones can be measured and used to coordinate operation of the zones. For example, the subject module 20 may be configured, each time its sensor 28 sends a package detect signal, to check the last sensor state reported by the downstream module. If the last reported state is CLEAR, the subject module 20 sets a flag indicating that the subject module sensor 28 was blocked first. This flag is retained until the subject module sensor's state changes from BLOCKED to CLEAR.

It should be noted that the present invention may be adapted to handle packages having lengths of more than two zones by extending the consideration of the order of blockage of sensors downstream. For example, in FIG. 21, the conveyor 10 of another embodiment of the present invention is shown conveying an oversized package O1 that requires three zones. In this situation, the module 20 of upstream zone N senses that is was encountered first and is outputting a RUN signal to correspond to the module of the downstream zone N+1 outputting a RUN signal. Similarly, the module 20 of the zone N+1 has sensed the package O1 before the downstream module of zone N+2 and outputs a RUN signal to correspond to that of the module of the downstream zone N+2.

It should be noted that preferably, the accumulation conveyor 10 runs faster than a conveyor that is feeding it to ensure that there is separation between packages. In addition, packages loaded on the conveyor should avoid crowding or interruption of product detection.

The present invention has many advantages. For example, an oversized package O1 is only assigned a long zone (via use of multiple zones) if it needs the additional zone or zones. Short packages, P1, P2, etc., only occupy the space required on the conveyor 10. When the packages are released for transport, they are singulated regardless of size allowing good control of the packages with a single base zone length in between them. Since the base zones are shorter than at least some of the packages on the conveyor 10, the conveyor will be more densely populated during transport than a conventional conveyor with longer zones. With a large amount of the packages being oversized packages, the conveyor 10 may be more than 50% populated during transport, increasing throughput and efficiency.

Many modifications and other embodiments of the inventions set forth herein will come to mind to one skilled in the art to which these inventions pertain having the benefit of the teachings presented in the foregoing descriptions and the associated drawings. For example, the length of the oversized package O1 could also be measured in other ways, such as by use of a laser or video analysis. This length information could in turn be used to coordinate operation of the number of zones needed to accommodate the measured length. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An accumulation conveyor comprising:
   a conveyor comprising a subject zone disposed adjacent to a downstream zone, the subject zone comprises a first sensor and a first drive system, the downstream zone comprises a second sensor and a second drive system, and wherein the first sensor is configured to be in a first detection state and the second sensor is configured to be in a second detection state; and
   logic circuitry disposed in communication with the first sensor, the first drive system, the second sensor, and the second drive system, wherein the logic circuitry is configured to:
   monitor the first detection state and the second detection state,
   determine a sequence by which the first sensor and the second sensor enter the first detection state and the second detection state, respectively, and
   generate a drive output for operating the first drive system and the second drive system substantially simultaneously, or independently, based on the first detection state, the second detection state, and the sequence by which the first sensor and the second sensor enter the first detection state and the second detection state, respectively.

2. The accumulation conveyor of claim 1, wherein the drive output operates the first drive system and the second drive system substantially independently in response to determining:
   the first sensor is in a blocked detection state;
   the second sensor is in a blocked detection state; and
   the first sensor enters the blocked detection state after the second sensor is in the blocked detection state.

3. The accumulation conveyor of claim 1, further comprising:
   a second downstream zone comprising a third sensor and a third drive system, and wherein the logic circuitry is configured to:
   monitor the second detection state and a third detection state of the third sensor;
   determine a second sequence by which the second sensor and the third sensor enter the second detection state and third detection state, respectively; and
   generate a second drive output for operating the second drive system and the third drive system substantially simultaneously, or independently, based on the second detection state, the third detection state, and the second sequence by which the second sensor and the third sensor enter the second detection state and third detection state, respectively.

4. The accumulation conveyer of claim 1, further comprising a motor configured to drive at least one of the first drive system and the second drive system.

5. The accumulation conveyor of claim 1, wherein the first detection state and the second detection state are the same.

6. The accumulation conveyor of claim 1, wherein the first detection state and the second detection state are different.

7. A method of controlling an accumulation conveyor comprising:
communicating with a first sensor, a first drive system, a second sensor, and a second drive system, wherein the first sensor and the first drive system are associated with a subject zone and wherein the second sensor and second drive system are associated with a downstream zone;
monitoring a first detection state of the first sensor and a second detection state of the second sensor;
determining a sequence by which the first sensor and the second sensor enter the first detection state and the second detection state, respectively; and
generating a drive output for operating the first drive system and the second drive system substantially simultaneously, or independently, based on the detection state of the first sensor, the detection state of the second sensor, and the sequence by which the first sensor and the second sensor enter the first detection state and the second detection state, respectively.

8. The method of claim 7, wherein generating the drive output comprises generating an independent drive output that operates the first drive system and the second drive system substantially independently in response to determining:
the first sensor achieves a blocked detection state;
the second sensor achieves a blocked detection state; and
the first sensor achieved the blocked detection state after the second sensor achieved the blocked detection state.

9. The method of claim 7, further comprising:
communicating with a third sensor and a third drive system, which are associated with a second downstream zone;
monitoring the second detection state and a third detection state of the third sensor;
determining a second sequence by which the second sensor and the third sensor enter the second detection state and third detection state, respectively; and
generating a second drive output for operating the second drive system and the third drive system substantially simultaneously, or independently, based on the detection state of the second sensor, the detection state of the third sensor, and the second sequence by which the second sensor and the third sensor enter the second detection state and the third detection state, respectively.

10. The method of claim 7, further comprising driving a motor configured to drive at least one of the first drive system and the second drive system.

11. The accumulation conveyor of claim 1, wherein the logic circuitry is further configured to:
determine a first number of zones needed to accommodate a first length of a first package based on the first detection state, the second detection state, and the sequence by which the first sensor and the second sensor enter the first detection state and the second detection state;
in response to determining the first number of the zones, allocating the first number of the zones for moving the first package; and
coordinate operation of the first number of the zones by generating the drive output.

12. The method of claim 7, wherein:
determining the sequence by which the first sensor and the second sensor enter the first detection state and the second detection state includes determining a first number of zones needed to accommodate a first length of a first package, and
in response to determining the first number of the zones, the method further comprises:
allocating the first number of the zones for moving the first package; and
coordinating the operation of the first number of the zones by generating the drive output.

* * * * *